UNITED STATES PATENT OFFICE.

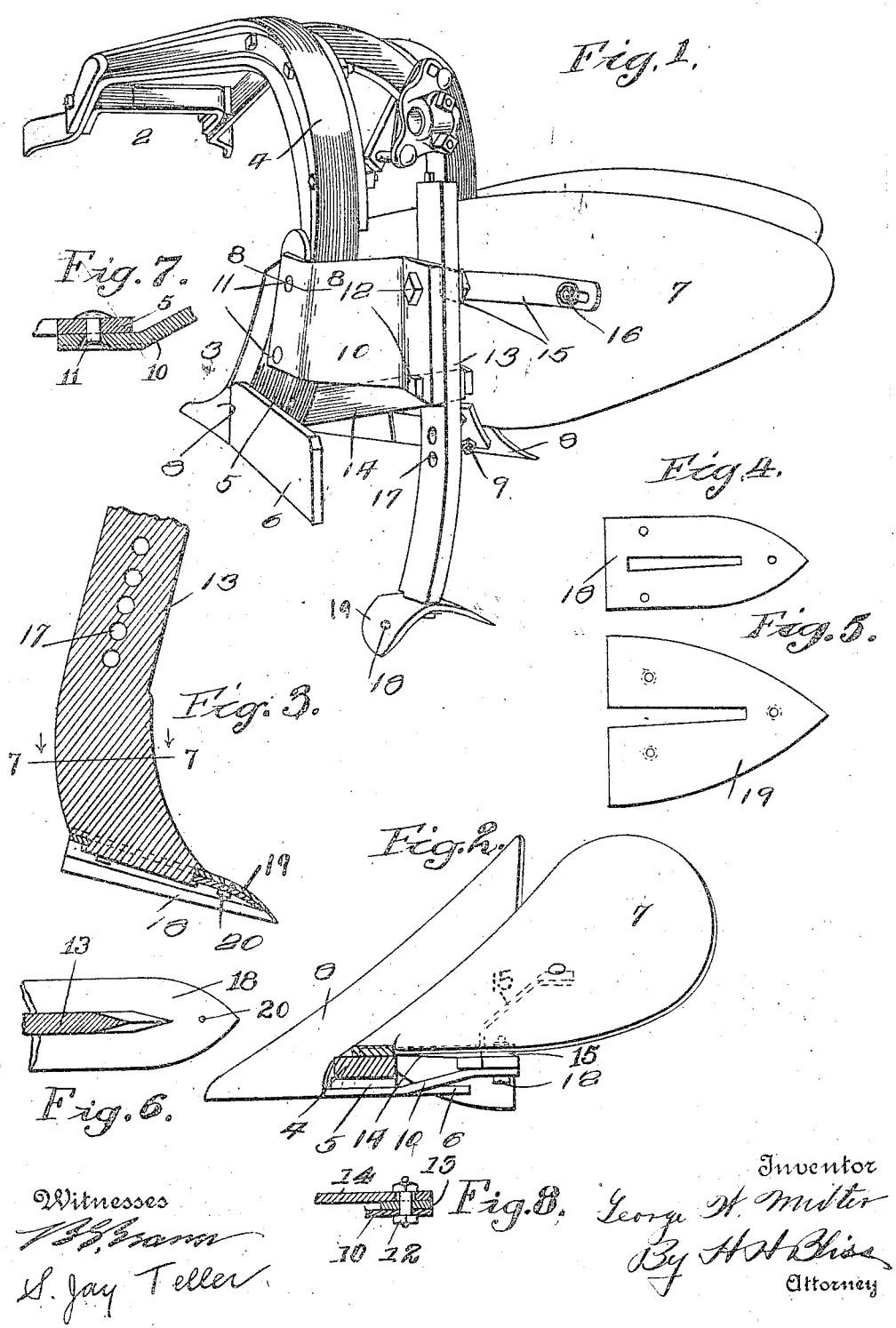

GEORGE W. MIXTER, OF MOLINE, ILLINOIS, ASSIGNOR TO DEERE & COMPANY, OF MOLINE, ILLINOIS, A CORPORATION OF ILLINOIS.

PLOW.

1,032,020.

Specification of Letters Patent.

Patented July 9, 1912.

Application filed May 16, 1910. Serial No. 561,597.

*To all whom it may concern:*

Be it known that I, GEORGE W. MIXTER, a citizen of the United States, residing at Moline, in the county of Rock Island and State of Illinois, have invented certain new and useful Improvements in Plows, of which the following is a specification, reference being had therein to the accompanying drawing.

This invention relates to improvements in plows. It is especially adapted for use in connection with engine gang plows, although it is also applicable to plows of other types.

The object of the invention is to provide a plow having a sub-soil attachment with certain improved structural features and with improved means for adjusting the sub-soil plow relative to the main plow.

Other objects will appear in the following specification and in the accompanying drawings.

Of the accompanying drawings which illustrate one embodiment of my invention, Figure 1 is a rear perspective view of a pair of plow bottoms, upon one of which is mounted my improved sub-soil attachment. Fig. 2 is a plan view of one of the plow bottoms. Fig. 3 is a vertical cross sectional view through the sub-soil attachment. Fig. 4 is a detail plan view of the sub-soil frog. Fig. 5 is a detail plan view of the sub-soil plow. Fig. 6 is a cross-sectional view taken along the line 7—7 of Fig. 4. Fig. 7 is a fragmentary cross sectional view taken along the line 8—8 of Fig. 2. Fig. 8 is a cross-sectional plan view through the connection between the lower brace and sub-soiler standard.

4 represents a standard to which is connected a plow body. 5 is a frog bolted or riveted to the standard, and to this frog are connected by means of suitable bolts or rivets, the land side 6 and the mold-board 7. The pointed share 8 is preferably made detachable from the other parts of the plow body, and is connected to them by means of bolts and brackets such as are indicated at 9.

10 is a rearward extending bracket which is connected at its forward end with the frog 5 by means of rivets such as are indicated by 11. I prefer that these rivets be loose in order that a certain limited movement may be possible between the frog and the bracket.

The bracket 10 is off-set away from the land side of the plow. To the rear end of the bracket is connected, by means of bolts 12, 12, a vertical standard 13. The lower of the bolts 12 passes through the apertured rear end of a brace 14, the forward end of the brace being connected to the standard 4. The upper of the bolts 12 passes through the apertured end of a brace 15. The brace is bent to extend laterally and to engage at its other end with the under side of the mold-board. A stud 16 on the mold-board passes through the slotted end of the brace 15. By loosening the nut on the stud 16, the brace may be moved and the lateral position of the standard 13 relative to the main plow bottom may be adjusted. Tightening the nut on the stud 16 secures the standard 13 against lateral movement.

The standard 13 is provided with a series of holes 17 for the bolts 12, and by removing the bolts, the vertical position of the standard may be changed. Insertion of the bolts into the proper holes locks the standard in vertical position.

The forward edge of the lower part of the standard 13 is preferably sharpened in order to permit it to move freely through the soil. The lower end of the standard 13 is mortised to receive the sub-soil frog 18 and after the frog has been placed in position the lower end of the standard is forged or swaged to permanently secure the frog. The sub-soil shoe or plow 19 is slotted to pass over the standard and is secured to the frog by means of bolts 20. It will be noted, therefore, that the shoe is easily and quickly detachable from the other parts of the device, and may be replaced or removed for sharpening at any time.

It will be noted that I have provided by my invention a sub-soil plow which may be adjusted both vertically and laterally relative to the main plow. Vertical adjustment regulates the depth to which the soil is loosened, and the lateral adjustment permits the proper alinement of the sub-soil plow with the main plow.

What I claim is:

1. In a plow, the combination with a main plow body of a sub-soil plow, devices for connecting the sub-soil plow to the main plow body, adapted to permit both vertical and transverse adjustment, and devices for locking the sub-soil plow in adjusted position.

2. In a plow, the combination of a plow standard, a plow body secured to the standard, a second standard, a sub-soil plow secured to the second standard, connecting devices between the main standard and the second standard adapted to permit the vertical and transverse adjustment of the second standard, and devices for locking the second standard in adjusted position.

3. In a plow, the combination of a plow standard, a plow body secured to the standard, a rearward extending bracket connected with the plow body and adjustable laterally at its rear end, a second standard connected with the rear end of the bracket, a sub-soil plow secured to the second standard, and means for locking the said second standard and sub-soil plow in horizontally adjusted position.

4. In a plow, the combination with a plow standard and a plow body, of a rearward extending bracket connected with the plow body, a vertical second standard connected with the rear end of the bracket, a sub-soil plow secured to the bottom of the second standard, and a brace extending transversely between the second standard and the plow body.

5. In a plow, the combination of a plow standard, a plow body secured to the standard, a bracket loosely connected at its forward end with the plow body to permit transverse movement of its rear end, a second standard secured to the rear end of the bracket, a sub-soil plow secured to the bottom of the second standard, a transverse brace connected at one end to the second standard, and a device for connecting the other end of the brace to the plow body in any one of a plurality of positions.

In testimony whereof I affix my signature, in presence of two witnesses.

GEORGE W. MIXTER.

Witnesses:
S. S. SWANSON,
A. H. HEAD.